US009216564B2

(12) United States Patent
Walsh et al.

(10) Patent No.: US 9,216,564 B2
(45) Date of Patent: Dec. 22, 2015

(54) SYSTEMS AND METHODS FOR FORMING LAMINATES WITH PATTERNED MICROWAVE ENERGY INTERACTIVE MATERIAL

(75) Inventors: Joseph C. Walsh, Boulder, CO (US); Mark Sinclair, Arvada, CO (US); Jeffrey T. Sloat, Broomfield, CO (US)

(73) Assignee: Graphic Packaging International, Inc., Atlanta, GA (US)

( * ) Notice: Subject to any disclaimer, the term of this patent is extended or adjusted under 35 U.S.C. 154(b) by 198 days.

(21) Appl. No.: 13/565,195

(22) Filed: Aug. 2, 2012

(65) Prior Publication Data

US 2013/0032283 A1 Feb. 7, 2013

Related U.S. Application Data (60) Provisional application No. 61/514,600, filed on Aug. 3, 2011, provisional application No. 61/569,919, filed on Dec. 13, 2011.

(51) Int. Cl.

| | |
|---|---|
| *B29C 65/52* | (2006.01) |
| *B32B 37/12* | (2006.01) |
| *B32B 37/20* | (2006.01) |
| *B32B 37/30* | (2006.01) |
| *B32B 38/10* | (2006.01) |
| *B32B 38/00* | (2006.01) |
| *B32B 37/02* | (2006.01) |
| *B32B 38/04* | (2006.01) |
| *B32B 37/00* | (2006.01) |

(52) U.S. Cl.
CPC ............ *B32B 38/10* (2013.01); *B32B 37/0076* (2013.01); *B32B 37/02* (2013.01); *B32B 37/1292* (2013.01); *B32B 38/0004* (2013.01); *B32B 2038/045* (2013.01); *B32B 2439/70* (2013.01); *Y10T 156/12* (2015.01)

(58) Field of Classification Search
USPC .................................................. 156/247, 249
See application file for complete search history.

(56) References Cited

U.S. PATENT DOCUMENTS

| | | | | |
|---|---|---|---|---|
| 4,012,552 A | * | 3/1977 | Watts ............................ | 428/200 |
| 4,605,461 A | * | 8/1986 | Ogi ................................ | 156/233 |
| 4,775,771 A | | 10/1988 | Pawlowski et al. | |

(Continued)

FOREIGN PATENT DOCUMENTS

| | | | | |
|---|---|---|---|---|
| EP | 1 796 988 | | 2/2012 | |
| JP | 05314888 A | * | 11/1993 | ............. H01H 69/02 |

(Continued)

OTHER PUBLICATIONS

English Abstract of JP 05-314888 (Jul. 10, 2014).*

(Continued)

*Primary Examiner* — Sing P Chan
(74) *Attorney, Agent, or Firm* — Womble Carlyle Sandridge & Rice, LLP (57) ABSTRACT

Portions of microwave energy interactive material may be cut and removed during intermediate steps in a lamination processes, so that remaining microwave energy interactive material in a resultant laminate is arranged in a pattern. Regarding the removal of the portions of the microwave energy interactive material, a compound laminate may be delaminated into parts, and one of the parts may be a sacrificial laminate that includes the removed portions of the microwave energy interactive material.

21 Claims, 9 Drawing Sheets

(56) References Cited

U.S. PATENT DOCUMENTS

| | | | |
|---|---|---|---|
| 4,865,921 A | 9/1989 | Hollenberg et al. | |
| 4,890,439 A | 1/1990 | Smart et al. | |
| 4,936,935 A | 6/1990 | Beckett | |
| 4,963,424 A | 10/1990 | Beckett | |
| 5,039,364 A | 8/1991 | Beckett et al. | |
| 5,117,078 A | 5/1992 | Beckett | |
| 5,213,902 A | 5/1993 | Beckett | |
| 5,221,419 A | 6/1993 | Beckett | |
| 5,260,537 A | 11/1993 | Beckett | |
| 5,266,386 A | 11/1993 | Beckett | |
| RE34,683 E | 8/1994 | Maynard et al. | |
| 5,340,436 A | 8/1994 | Beckett | |
| 5,354,973 A | 10/1994 | Beckett | |
| 5,410,135 A | 4/1995 | Pollart et al. | |
| 5,424,517 A | 6/1995 | Habeger, Jr. et al. | |
| 5,519,195 A | 5/1996 | Keefer et al. | |
| 5,628,921 A | 5/1997 | Beckett | |
| 5,672,407 A | 9/1997 | Beckett | |
| 5,759,422 A | 6/1998 | Schmelzer et al. | |
| 5,800,724 A | 9/1998 | Habeger et al. | |
| 5,820,971 A * | 10/1998 | Kaule et al. | 428/209 |
| 6,114,679 A | 9/2000 | Lai et al. | |
| 6,150,646 A | 11/2000 | Lai et al. | |
| 6,204,492 B1 | 3/2001 | Zeng et al. | |
| 6,214,444 B1 * | 4/2001 | Uchibori | 428/209 |
| 6,251,451 B1 | 6/2001 | Zeng | |
| 6,414,290 B1 | 7/2002 | Cole et al. | |
| 6,433,322 B2 | 8/2002 | Zeng et al. | |
| 6,455,827 B2 | 9/2002 | Zeng | |
| 6,552,315 B2 | 4/2003 | Zeng et al. | |
| 6,677,563 B2 | 1/2004 | Lai | |
| 6,717,121 B2 | 4/2004 | Zeng et al. | |
| 6,765,182 B2 | 7/2004 | Cole et al. | |
| 2007/0215611 A1 | 9/2007 | O'Hagan et al. | |
| 2008/0230176 A1 * | 9/2008 | Van De Weijer et al. | 156/245 |
| 2009/0302032 A1 | 12/2009 | Middleton | |
| 2011/0127257 A1 | 6/2011 | Lai | |

FOREIGN PATENT DOCUMENTS

| | | |
|---|---|---|
| WO | WO 2005/068321 | 7/2005 |
| WO | WO 2006/052785 | 5/2006 |

OTHER PUBLICATIONS

Machine English Translation of JP 05-314888 (Jul. 10, 2014).*

International Search Report and Written Opinion of the International Search Authority from corresponding International Application No. PCT/US2012/049273, mailed Feb. 28, 2013.

* cited by examiner

SYSTEMS AND METHODS FOR FORMING LAMINATES WITH PATTERNED MICROWAVE ENERGY INTERACTIVE MATERIAL

CROSS-REFERENCED TO RELATED APPLICATIONS

This application claims the benefit of both U.S. Provisional Application No. 61/514,600, filed Aug. 3, 2011, and U.S. Provisional Application No. 61/569,919, filed Dec. 13, 2011. Each of U.S. Provisional Application No. 61/514,600, filed Aug. 3, 2011, and U.S. Provisional Application No. 61/569,919, filed Dec. 13, 2011, is incorporated herein by reference in its entirety.

FIELD OF THE DISCLOSURE

This disclosure relates to systems and methods for making laminates that include patterned microwave energy interactive material and may be formed into constructs, such as blanks, cartons, press-formed constructs, or the like.

BACKGROUND

Microwave ovens provide a convenient means of cooking and reheating food items. Many combinations of materials of different character have been used in microwave packaging to influence the effect of the microwave energy on the food product being heated. These microwave packaging materials may be microwave transparent, for example, paper, paperboard, or many plastics, or they may be microwave energy interactive, for example, metal foils or thin metal deposits. Microwave transparent materials generally provide, for example, food product support, packaging form, insulation, and/or vapor barrier functions in packaging. Microwave energy interactive material generally provides, for example, enhanced surface heating, microwave shielding, enhanced microwave transmission, and/or energy distribution functions in packaging.

Microwave packaging often is created and configured of both microwave transparent and microwave energy interactive materials. For example, MicroRite brand trays, which are available from Graphic Packaging International, Inc., comprise aluminum foil laminated to paperboard. The aluminum foil is typically configured in predetermined shapes that define a pattern, wherein the shapes/pattern may be formed by chemically etching away (in a caustic bath) some of the foil and/or chemical deactivation of some of the foil. The configuration of the microwave energy interactive material determines the performance characteristics of the microwave energy interactive material.

BRIEF SUMMARY

One aspect of this disclosure is the provision of systems and methods for providing a laminate, wherein the laminate may be formed into a construct for use in cooking and/or reheating food in a microwave oven, the laminate includes both microwave transparent and microwave energy interactive materials, and the microwave energy interactive material may be formed into a pattern without using chemical etching or deactivation. More specifically and in one example, portions of the microwave energy interactive material may be cut and removed during intermediate steps in the lamination processes, so that the remaining microwave energy interactive material in the resultant laminate is arranged in the pattern. That is, the pattern may be formed without using chemical etching or chemical deactivation. Further regarding the removal of the portions of the microwave energy interactive material, a compound laminate may be separated (e.g., delaminated) into parts, and one of the parts may be a sacrificial laminate that includes the removed portions of the microwave energy interactive material.

Alternatively, this disclosure is not limited to forming the pattern in the microwave energy interactive material solely by cutting and removing predetermined pieces of the microwave energy interactive material. For example and optionally, the cutting and removing of the predetermined pieces of the microwave energy interactive material may be used to form an initial (e.g., coarse) pattern in the microwave energy interactive material, and the initial pattern may be fine tuned or otherwise transformed into a subsequent (e.g., fine) pattern using any suitable technique, such as chemical deactivation and/or chemical etching.

In accordance with one aspect of this disclosure, a laminate may have microwave interactive material positioned between a barrier layer and a substrate, the barrier layer may obstruct holes in the microwave interactive material, and holes in the substrate may be superposed with the holes in the microwave interactive material.

The foregoing presents a simplified summary of some aspects of this disclosure in order to provide a basic understanding. The foregoing summary is not an extensive summary and is not intended to identify key or critical elements of the invention or to delineate the scope of the invention. The purpose of the foregoing summary is to present some concepts of this disclosure in a simplified form as a prelude to the more detailed description that is presented below. For example, other aspects will become apparent from the following.

BRIEF DESCRIPTION OF THE DRAWINGS

Having described some aspects of this disclosure in general terms, reference will now be made to the accompanying drawings, which are not necessarily drawn to scale. The drawings are schematic and exemplary only, and should not be construed as limiting the invention.

DETAILED DESCRIPTION

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the invention.

Referring now in greater detail to the drawings, initially FIG. 1, a system 20 and associated methods of a first embodiment of this disclosure are described in the following. In accordance with one aspect of this disclosure, the system 20 and associated methods may be utilized in the fabrication of a resultant laminate 22 comprising both microwave transparent and microwave energy interactive materials. In the resultant laminate 22, the microwave energy interactive material may be configured in predetermined shapes that define a pattern, so that the shapes/pattern affect the operativeness of the microwave energy interactive material. In the system 20 of the first embodiment, there are several stages respectively associated with laminates that are precursors to the resultant laminate 22. The precursor laminates may be an initial laminate 24, kisscut laminate 26, compound laminate 28, and intermediate laminate 30.

The initial laminate 24 comprises a web of base material 32 and a web comprising microwave energy interactive material 34 that are secured together. For ease of readability, the web of base material 32 may be referred to as a base web 32 in the following. Similarly, the web comprising microwave energy interactive material 34 may be referred to as an interactive web 34 in the following.

The base web 32 is typically suitable for being formed into constructs such as, but not limited to, blanks, cartons, trays, bowls, press-formed constructs, or the like, that may include microwave energy interactive material. As a more specific example, the base web 32 may be suitable for being cut into blanks that are for being formed into the constructs that may include microwave energy interactive material and may be used in cooking and/or reheating food in a microwave oven. In accordance with the first embodiment, the base web 32 is paperboard, or alternatively cardboard, although any other suitable material may be used.

In one example, the interactive web 34 may be a web of foil, wherein the foil is a thin sheet of metal such as, but not limited to, aluminum. As a more general example, the interactive web 34 may be a web of foil having a thickness sufficient to reflect at least a portion (and up to 100%) of impinging microwave energy. Such webs of foil typically are formed from a conductive, reflective metal or metal alloy, for example, aluminum, copper, or stainless steel, generally having a thickness of from about 0.000285 inches to about 0.005 inches, for example, from about 0.0003 inches to about 0.003 inches. Such webs of foil may more specifically have a thickness of from about 0.00035 inches to about 0.002 inches, for example, 0.0016 inches.

In another example, the interactive web 34 may comprise a web of foil (e.g., the web of foil discussed above) joined to a substrate, for example, paper or paperboard (i.e., a foil laminate). The foil may be joined to the substrate in any suitable manner, for example, using a substantially continuous layer or any other suitable arrangement of adhesive material. Such a foil laminate may have greater dimensional stability and, therefore, may be easier to process (e.g., unwind, kiss cut, etc.). The foil that is or is part of the interactive web 34 may be referred to as layer of microwave interactive material. The microwave interactive material may be for influence the effect of the microwave energy on a food product being heated in association with a construct formed from a section of the resultant laminate 22. Such a construct may be formed in a conventional or other suitable manner.

The initial laminate 24 is formed at an upstream laminating station of the system 20. The base and interactive webs 32, 34 are respectively drawn from supply rolls 36, 38, such as in response to operation of one or more pairs of nip rollers 40, 42, so that the base and interactive webs 32, 34 are nipped together between the upstream nip rollers 40. When the interactive web 34 comprises a foil laminate, the foil laminate 34 may be configured so that the substrate faces towards the base web 32 or away from the base web 32 (e.g., so that the foil is positioned between substrate and the base web 32). For example, it may be desirable in some microwave heating products to conceal, partially conceal or mask the typically silver color of the foil. In other applications, it may be desirable to provide a particular appearance on the visible side of the resulting laminate. In such applications, the foil laminate 34 may be configured so that the foil faces the base web 32 and the substrate (e.g. paper) faces outwardly. The substrate may be white, black, or otherwise colored, patterned, and/or provided with text and/or graphics, as desired, using any suitable technique. Alternatively, it may be desirable in some microwave heating products to have the foil be visible, or it may be easier to adhere the substrate to the base web 32 in some processes. In such instances, the foil laminate 34 may be configured so that the substrate (e.g. paper) faces the base web 32 and the foil faces outwardly.

Prior to the nipping between the upstream nip rollers 40, one or more adhesive applicators 46 may apply adhesive material to what will become the inner face of the base web 32 and/or what will become the inner face of the interactive web 34. The one or more adhesive applicators 46 apply the adhesive material in a manner so that there is a predetermined pattern of adhesive material between the base and interactive webs 32, 34 in the initial, kisscut and compound laminates 24, 26, 28. In accordance with the first embodiment, the adhesive pattern between the base and interactive webs 32, 34 may correspond or substantially correspond in shape to the pattern of the microwave energy interactive material in the resulting laminate 22, or any other suitable adhesive pattern may be used, as discussed in greater detail below.

Any suitable adhesive material may be supplied by the one or more adhesive applicators 46. For example, the one or more adhesive applicators 46 may supply wet-bond adhesive material, in which case the adhesive material will be tacky during the nipping between the upstream nip rollers 40. Optionally, any suitable drying system 48, such as a drying oven, may be positioned downstream from the upstream nip rollers 40 for at least aiding in the drying of the adhesive material of the initial laminate 24. The adhesive material supplied from the adhesive applicator(s) 46 is dried and/or cured so that the base and interactive webs 32, 34 are bonded together. Throughout this disclosure, each of the adhesive materials that are discussed may be applied with any suitable adhesive applicators, such as, but not limited to, patterned roll-on applicators; patterned stamp applicators; movable, computer-controlled nozzle applicators, or the like. Also, each of the adhesive materials may be dried or otherwise cured in any suitable manner.

Figure 2:
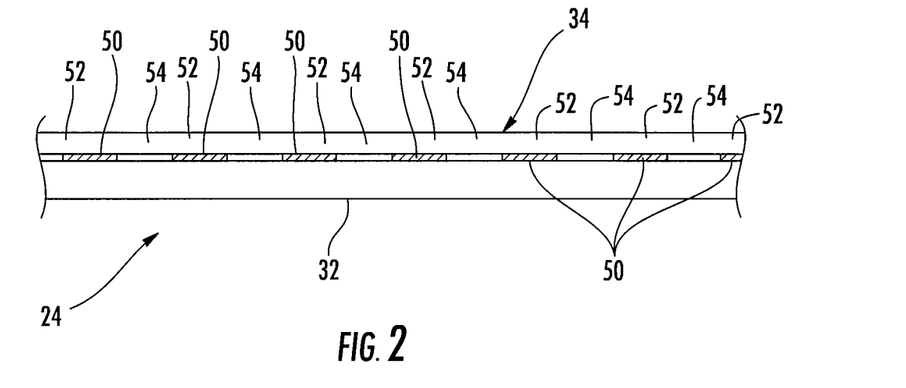
FIG. 2 is a side elevation view of a section of an initial laminate, wherein the initial laminate is a precursor to the resultant laminate, and the initial laminate is formed at an upstream laminating station of the system, in accordance with the first embodiment.

In the initial laminate 24, the adhesive pattern between the base and interactive webs 32, 34 defines both bonded and unbonded areas. More specifically and referring to FIG. 2, the segments of the adhesive material ("adhesive segments 50") of the adhesive pattern between the base and interactive webs 32, 34 define bonded areas of the initial laminate 24. Accordingly, in each of the bonded areas, the adjacent surfaces of the base and interactive webs 32, 34 are bonded together by a respective adhesive segment 50. Throughout the drawings, the adhesive segments 50 are schematically at least partially illustrated by hatching. The adhesive segments 50 indirectly define the unbonded areas of the initial laminate 24 so that, in each of the unbonded areas, the adjacent surfaces of the base and interactive webs 32, 34 are in opposing face-to-face relation (e.g., opposing face-to-face contact) with one another, but are not bonded to one another. Accordingly, in the initial laminate 24, there are both: sections of the interactive web 34 that are bonded to the base web 32, and sections of the interactive web 34 that are not bonded to the base web 32. The sections of the interactive web 34 that are bonded to the base web 32 may be generally referred to as bonded interactive sections. More specifically and for reasons that will become more apparent in the following, the sections of the interactive web 34 that are bonded to the base web 32 may be more specifically referred to as retained interactive sections 52. Also for reasons that will become more apparent in the following, the sections of the interactive web 34 that are not bonded to the base web 32 may be referred to as unretained interactive sections and/or scrap interactive sections 54.

Referring back to FIG. 1, the initial laminate 24 is transformed into the kisscut laminate 26 at a station for forming lines of disruption in the interactive web 34, and more specifically the station for forming the lines of disruption may be a cutting station of the system 20. Even more specifically, the initial laminate 24 may be transformed into the kisscut laminate 26 through the action of any suitable cutting system 56, 58. For example and not for purposes of limitation, the cutting system 56, 58 is shown in FIG. 1 in the form of counter roller 56 and a rotary cutter 58, and the initial laminate 24 is drawn between the counter roller 56 and rotary cutter 58. For example, the rotary cutter 58 may be in the form of a roller with outwardly projecting cutting features, such as cutting rules, cutting blades, or any other suitable cutting edges, configured for forming kiss cuts in the initial laminate 24, wherein the kiss cuts are arranged in a pattern ("kisscut pattern"). The kiss cutting occurs on the side of the initial laminate 24 that is defined by the interactive web 34, and the kiss cuts typically extend completely through the interactive web 34 without substantially penetrating (e.g., without penetrating, or typically only slightly penetrating) the base web 32. (It is noted that where the interactive web 34 comprises a foil laminate, the kiss cuts typically extend through both the foil and the substrate (e.g., paper or paperboard)). Accordingly and referring to FIG. 3, the kiss cuts may be characterized as being die cuts 60 in the interactive web 34, such that the kisscut pattern is defined by the die cuts 60. Each of the die cuts 60 may be more generally referred to as a line of separation such as, but not limited to, a slit, cut line, tear line, line of perforations, and/or the like. The kisscut pattern/die cuts 60 in the interactive web 34 may be formed in any suitable manner, such as with one or more rotary dies, flat dies, lasers, and/or the like, such that substantially only the interactive web 34 is cut.

Figure 3:
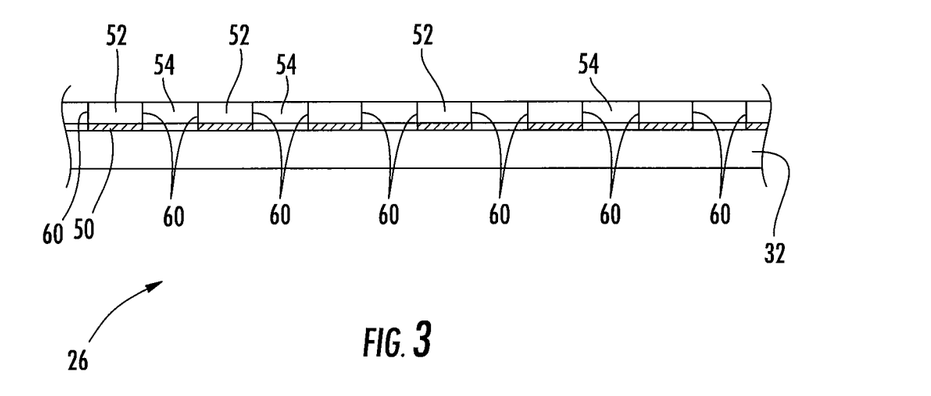
FIG. 3 is a side elevation view of a section of a kisscut laminate, wherein the kisscut laminate is a precursor to the resultant laminate, and the kisscut laminate is formed at a cutting station of the system, in accordance with the first embodiment.

Referring to FIG. 3, the lines of disruption/kisscut pattern/die cuts 60 in the interactive web 34 at least partially define the retained and scrap interactive sections 52, 54 of the interactive web 34. More specifically, the lines of disruption/kisscut pattern/die cuts 60 respectively substantially separate the retained and scrap interactive sections 52, 54 of the interactive web 34 from one another. Even more specifically, the kisscut pattern/die cuts 60 are such that each of the retained interactive sections 52 is substantially circumscribed by the respective die cut (e.g., line of separation such as, but not limited to, a slit, cut line, tear line, line of perforations, and/or the like). As will be discussed in greater detail below, the kisscut pattern and the adhesive pattern between the base and interactive webs 32, 34 may not be perfectly matched (e.g., may be slightly offset and/or comprise different sizes).

Figure 1:
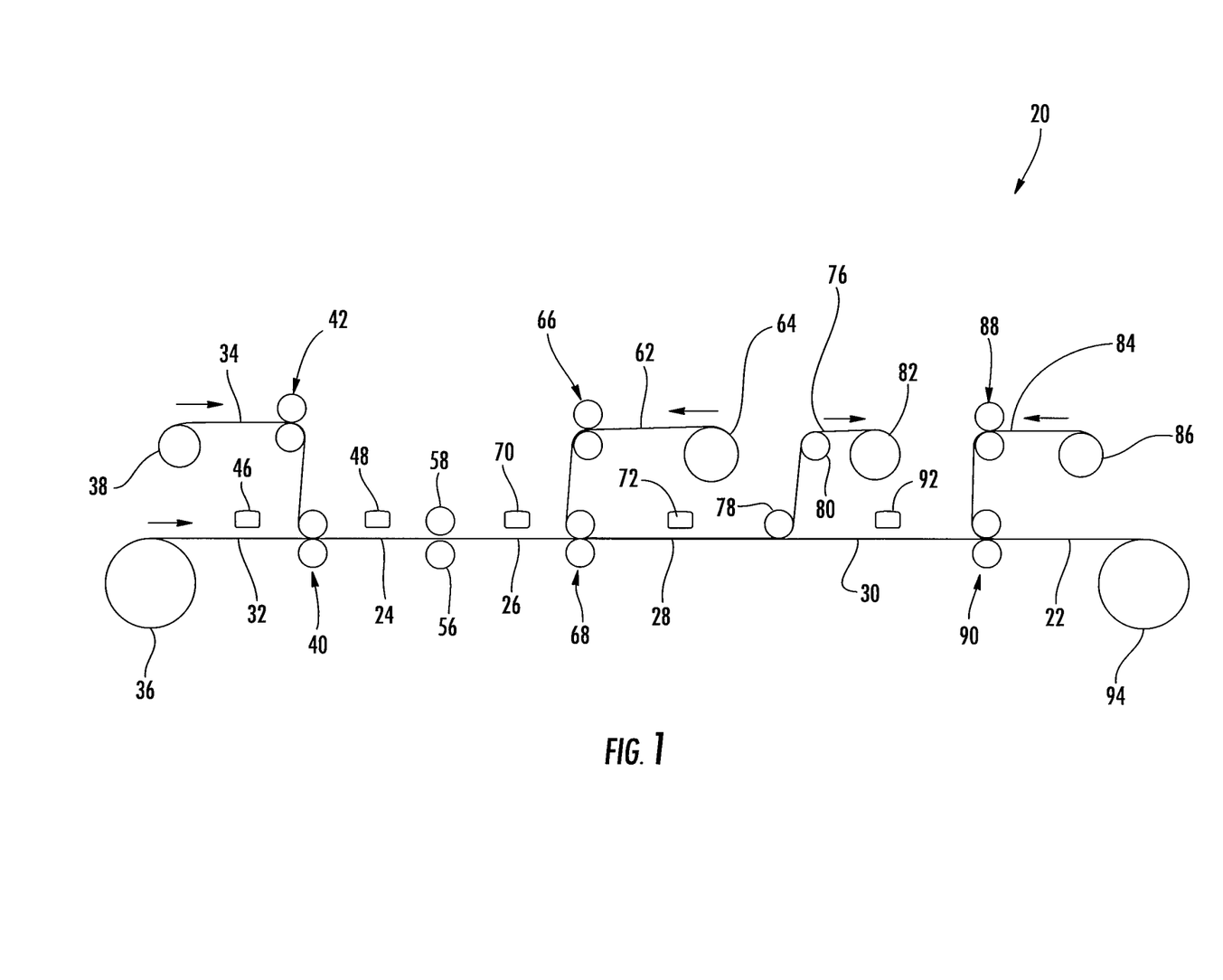
FIG. 1 is a side elevation view of a system for making a resultant laminate that includes patterned microwave energy interactive material, in accordance with a first embodiment of this disclosure.

Referring to FIG. 1, a compound laminate 28 is formed at an intermediate laminating station of the system 20. The compound laminate 28 comprises the kisscut laminate 26 and a web of sacrificial material 62 that are secured together. For ease of readability, the web of sacrificial material 32 may be referred to as a sacrificial web 62 in the following. For example, the sacrificial web 62 may be a web of low-cost, disposable material, such as, but not limited to, a thin gauge polymer film, for example, a polyethylene film, or any other suitable material, such as a reused or recycled material, as discussed in greater detail below.

The sacrificial web 62 is drawn from a supply roll 64, such as in response to operation of one or more pairs of nip rollers 66, 68, so that the kisscut laminate 26 and sacrificial web 62 are nipped together between the intermediate nip rollers 68. Prior to the nipping between the intermediate nip rollers 68, one or more adhesive applicators 70 apply adhesive material to what will become an inner face of the kisscut laminate 26 and/or what will become the inner face of the sacrificial web 62. The adhesive applicator(s) 70 apply the adhesive material in a predetermined pattern so that the scrap interactive sections 54 will become bonded to the sacrificial web 62, and the retained interactive sections 52 do not, or more generally substantially do not, become bonded to the sacrificial web 62. More specifically and in accordance with one version of the first embodiment, the adhesive material is supplied from the one or more adhesive applicators 70 to the outer surfaces of the scrap interactive sections 54 rather than to the retained interactive sections 52. Alternatively, the adhesive material may be supplied from the one or more adhesive applicators 70 to what will become the inner face of the sacrificial web 62 so that the scrap interactive sections 54 will become bonded to the sacrificial web 62, and the retained interactive sections 52 do not, or more generally substantially do not, become bonded to the sacrificial web 62.

Any suitable adhesive material may be supplied by the one or more adhesive applicators 70. For example, the one or more adhesive applicators 70 may supply a dry-bond adhesive material. As another example, the one or more adhesive applicators 70 may supply wet-bond adhesive material, in which case the adhesive material will typically be tacky during the nipping between the intermediate nip rollers 68. Optionally, any suitable drying system 72, such as a drying oven, may be positioned downstream from the intermediate nip rollers 68 for at least aiding in the drying of the adhesive material between the kisscut laminate 26 and the sacrificial web 62. The adhesive material supplied from the adhesive applicator(s) 70 is dried and/or cured so that the kisscut laminate 26 and sacrificial web 62 are bonded together. As one specific example, the adhesive material between the kisscut laminate 26 and the sacrificial web 62 may be curable by ultraviolet light, the sacrificial web 62 may be transparent and/or translucent, and the drying system 72 may shine ultraviolet light onto the outer surface of the sacrificial web 62 for curing the adhesive material between the kisscut laminate 26 and the sacrificial web 62.

Figure 4:
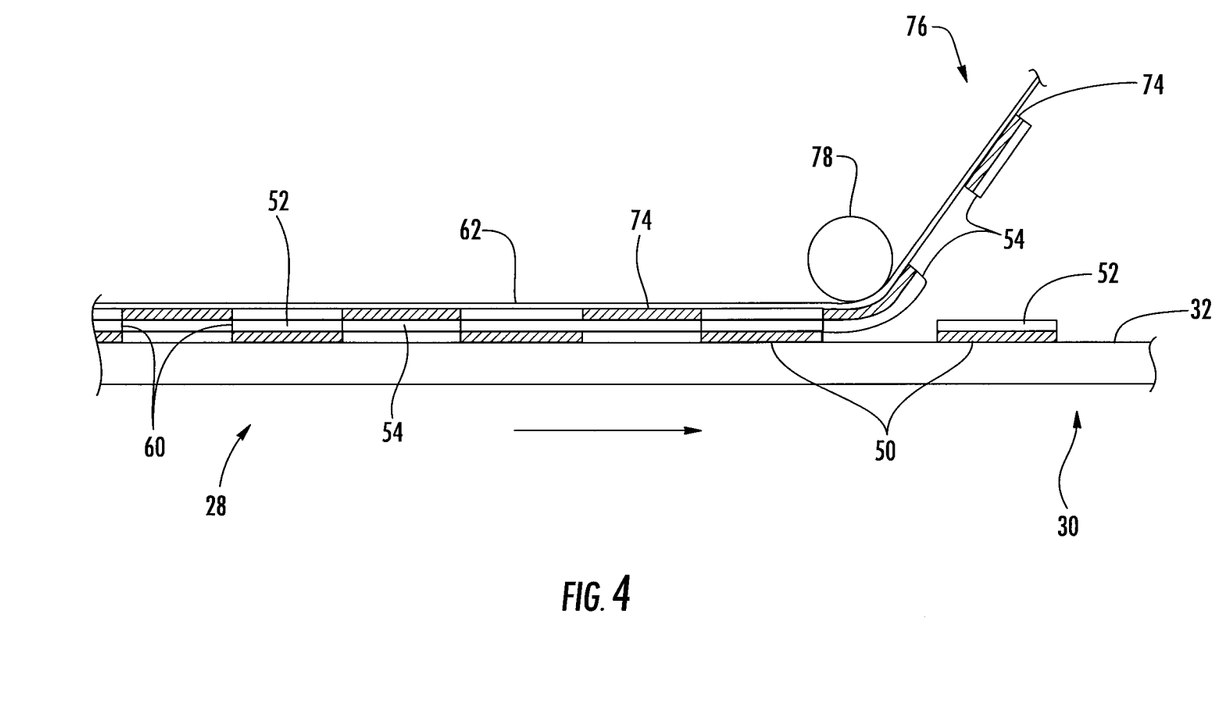
FIG. 4 is a side elevation view of a compound laminate being separated or delaminated (e.g., divided) into an intermediate laminate and a sacrificial laminate at a separating, stripping or delaminating station of the system, and each of the compound and intermediate laminates is a precursor to the resultant laminate, in accordance with the first embodiment.

In the compound laminate 28, the adhesive pattern between the kisscut laminate 26 and the sacrificial web 62 defines both bonded and unbonded areas in the compound laminate 28. More specifically and referring to the upstream portion of FIG. 4, the segments of adhesive material ("adhesive segments 74") of the adhesive pattern between the kisscut laminate 26 and the sacrificial web 62 are configured so that: the scrap interactive sections 54 of the kisscut laminate 26 are bonded to the sacrificial web 62, and the retained interactive sections 52 of the kisscut laminate 26 are not bonded (e.g., substantially not bonded) to the sacrificial web 62. Throughout the drawings, the adhesive segments 50, 74 are schematically at least partially illustrated by hatching.

Referring to FIG. 1, the intermediate laminate 30 is formed at a stripping, separating or delamination station of the system 20. The intermediate laminate 30 is formed from the compound laminate 28 by separating or delaminating the sacrificial web 62 and the scrap interactive sections 54 from a remainder of the compound laminate 28. More specifically, after the scrap interactive sections 54 have become secured to the sacrificial web 62, a sacrificial laminate 76, which comprises scrap interactive sections 54 secured to the sacrificial web 62, is stripped or delaminated from a remainder of the compound laminate 28. For example, the sacrificial laminate 76 may be stripped by drawing the sacrificial laminate around one or more rollers 78, 80, and forming the sacrificial laminate into a roll 82. The roll 82 may be characterized as being schematically illustrative of a conventional winding apparatus for forming the sacrificial laminate 76 into a roll. Whereas the sacrificial web 62 and scrap interactive sections 54 are removed, the retained interactive sections 52 remain secured to the base web 32, so that the intermediate laminate 30 comprises the base web 32 with retained interactive sections 52 secured thereto. That is, the compound laminate 28 is separated or delaminated (e.g., divided) into the intermediate laminate 30 and the sacrificial laminate 76 at the separating or delaminating station of the system 20.

In accordance with the first embodiment, prior to the intermediate laminate 30 and the sacrificial laminate 76 being separated or delaminated from one another, they may be releasably connected to one another by way of at least a portion of the die cuts 60 being in the form of breachable lines of disruption such as, but not limited to, line-like arrangements of spaced apart perforations, or other suitable tear lines. Alternatively and/or in addition, and as mentioned above, the kisscut pattern and the adhesive pattern between the base and interactive webs 32, 34 may not be perfectly matched (e.g., may be slightly offset and/or comprise different sizes) in a manner that provides a releasable connection or bond between the intermediate laminate 30 and the sacrificial laminate 76, as discussed in the following with reference to FIGS. 5-8.

Figure 5:
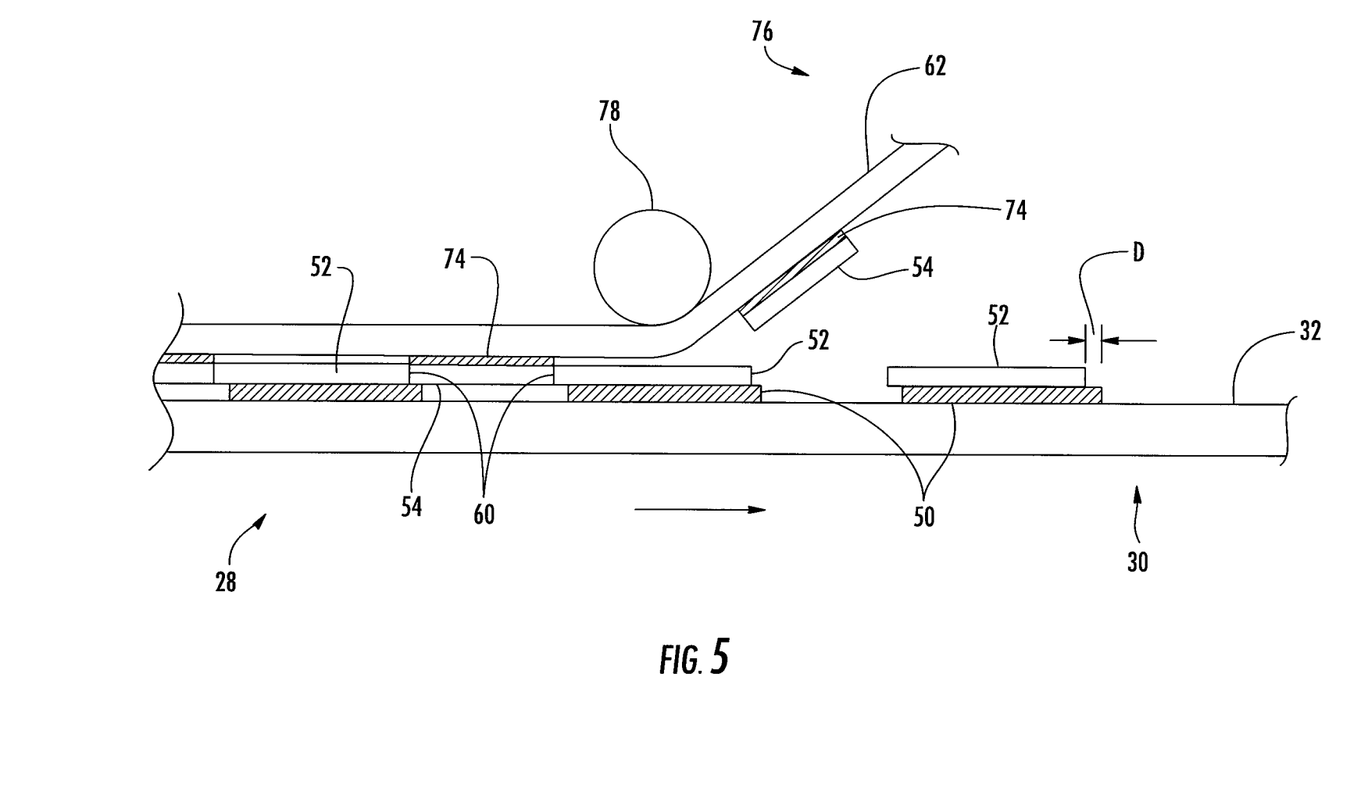
FIG. 5 is similar to FIG. 4, except for showing that adhesive segments and associated retained microwave energy interactive segments may be slightly out of phase.
Figure 6:
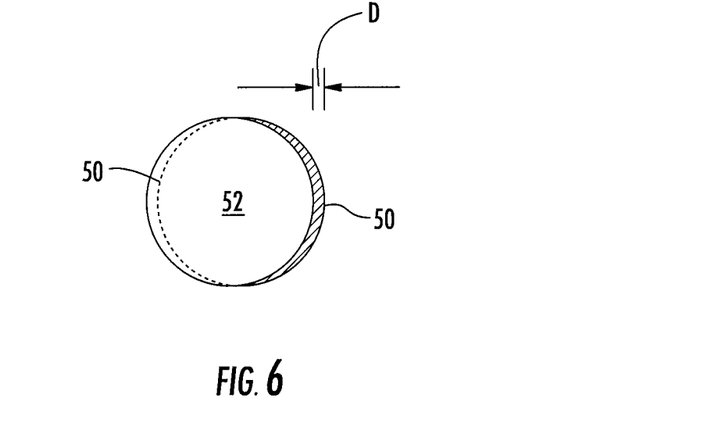
FIG. 6 is a representative, isolated top plan view of a combination of an adhesive segment and a retained microwave energy interactive segment of FIG. 5, showing that the adhesive segment and retained microwave energy interactive segment may be slightly out of phase.
Figure 7:
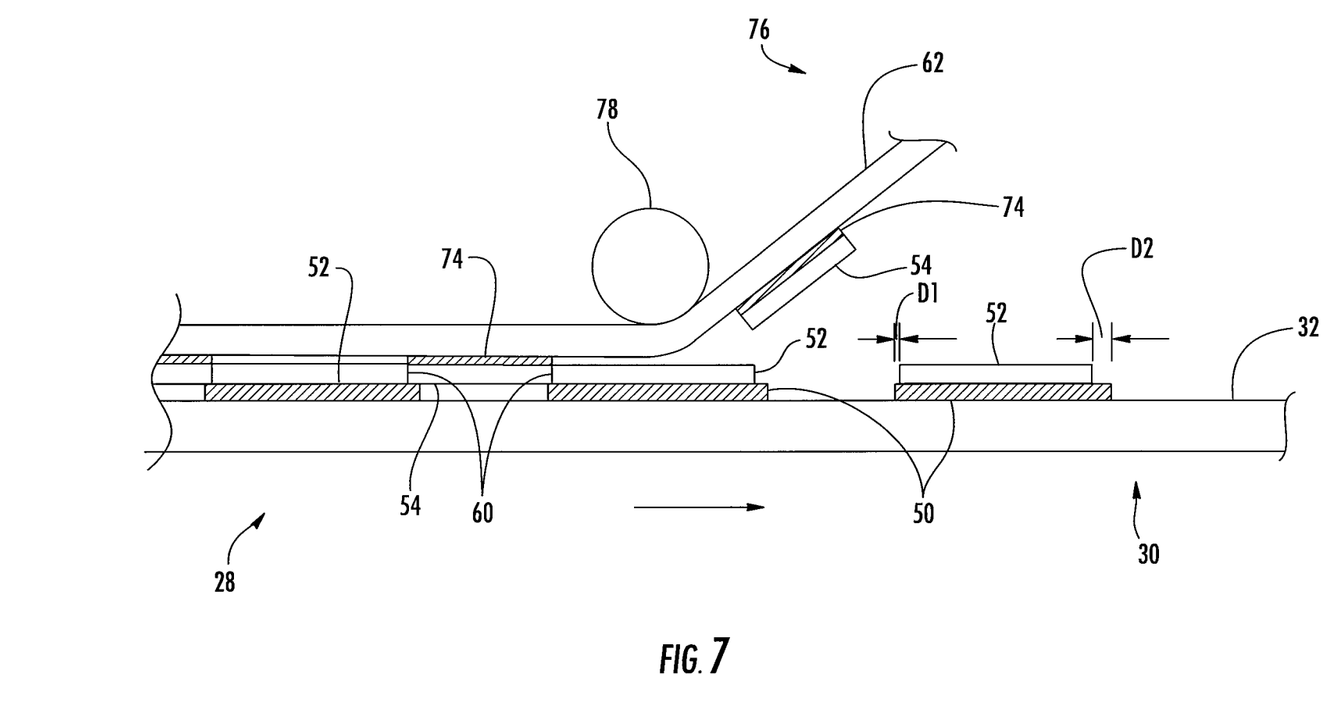
FIG. 7 is like FIG. 5, except for showing that adhesive segments and associated retained microwave energy interactive segments may be slightly different sizes and/or slightly out of phase.
Figure 8:
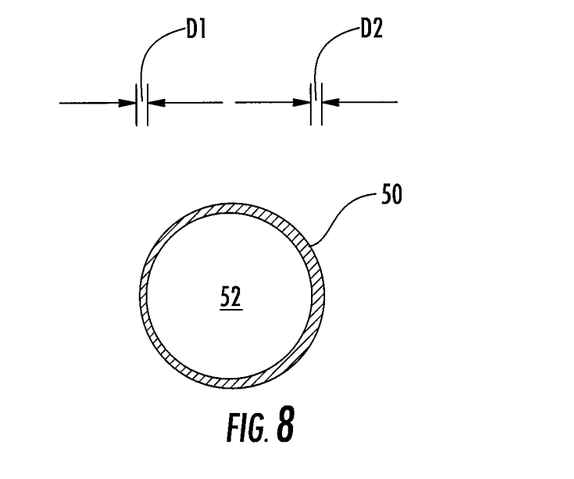
FIG. 8 is a representative, isolated top plan view of a combination of an adhesive segment and a retained microwave energy interactive segment of FIG. 7, showing that the adhesive segment and retained microwave energy interactive segment may be slightly different sizes and/or slightly out of phase.

In accordance with the first embodiment and referring to FIGS. 5-8, the one or more adhesive applicators 46 and cutting station/cutting system 56, 58 may operate in a coordinated manner so that the adhesive segments 50 and retained interactive sections 52 are slightly out of phase and/or the adhesive segments 50 are slightly larger than the retained interactive sections 52. More specifically, the dimension D in FIGS. 5 and 6 is illustrative of the adhesive segments 50 and retained interactive sections 52 being slightly out of phase. As another example, the dimensions D1 and D2 in FIGS. 7 and 8 are different, and thereby illustrative of the adhesive segments 50 being slightly larger than the retained interactive sections 52, and the adhesive segments 50 and retained interactive sections 52 being slightly out of phase. Alternatively, the adhesive segments 50 may be slightly larger than the retained interactive sections 52 without (e.g., substantially without) the adhesive segments 50 and retained interactive sections 52 being out of phase.

When adhesive segments 50 are slightly larger than the retained interactive sections 52 and/or the adhesive segments 50 and retained interactive sections 52 are slightly out of phase, a relatively small marginal portion of each adhesive segment 50 is adhered or bonded to the (respective) adjacent scrap interactive section(s) 54, as shown in FIGS. 5 and 7. The adhesive bond between the relatively small marginal portion of each adhesive segment 50 and the (respective) adjacent scrap interactive section(s) 54 may perform a desirable function. For example, the adhesive bond between the relatively small marginal portion of each adhesive segment 50 and the (respective) adjacent scrap interactive section(s) 54 may advantageously seek to: restrict the scrap interactive sections 52 from being transferred to the cutting tool (e.g., rotary cutter 58), restrict the scrap interactive sections 52 from prematurely separating from the base web 32, and/or restrict the intermediate and sacrificial laminates 30, 76 from separating from one another prematurely. The adhesive bond between the relatively small marginal portion of each adhesive segment 50 and the (respective) adjacent scrap interactive section(s) 54 is broken (e.g., via adhesive failure of the bonds/segments 50 and/or cohesive failure of the bonds/segments 50) when the compound laminate 28 is separated or delaminated (e.g., divided) into the intermediate laminate 30 and the sacrificial laminate 76 at the separating or stripping station of the system 20. That is, the adhesive bonds between the relatively small marginal portions of the adhesive segments 50 and the adjacent scrap interactive sections 54 are smaller than and/or weaker than the adhesive bonds between the adhesive segments 74 and the scrap interactive sections 54 so that the scrap interactive sections 54 are carried away by the sacrificial web 62 as it is stripped away at the stripping or delaminating station.

Alternatively, a relatively small and/or weaker adhesive bond between each of the scrap interactive sections 54 and the base web 32 may be provided in any other suitable manner, such that, and similarly to discussed above, the scrap interactive sections 54 are carried away by the sacrificial web 62 as it is stripped away at the stripping or delaminating station. For example, the one or more adhesive applicators 46 (FIG. 1) may apply a uniform or substantially uniform pattern of dots of adhesive material, or any other suitable pattern of adhesive material, across an entire surface of the inner face of the base web 32 and/or the inner face of the interactive web 34, so that each of the scrap interactive sections 54 is bonded by one or more dots of adhesive material to the base web 32. The adhesive bonds between the base web 32 and the adjacent scrap interactive sections 54 are smaller than and/or weaker than the adhesive bonds between the sacrificial web 62 and scrap interactive sections 54 so that the scrap interactive sections 54 are carried away by the sacrificial web 62 as it is stripped away at the stripping or delaminating station. In accordance with the first embodiment of this disclosure, the adhesive applicator(s) 46 of the upstream laminating station and/or the rotary cutter 58 of the cutting station may be configured so that both the retained interactive sections 52 and the scrap interactive sections 54 are bonded to the base web 32. Nonetheless, the connections (e.g., adhesive bonds) within the compound laminate 28 may contrast in a predetermined manner for facilitating the delamination between the intermediate and sacrificial laminates 30, 76.

Referring to FIG. 1, the resultant laminate 22 is formed at a downstream laminating station of the system 20. The resultant laminate 22 comprises the intermediate laminate 30 and a web of covering material 84 that are secured together. For ease of readability, the web of covering material 84 may be referred to as a barrier web 84 in the following. For example, the barrier web 84 may be a barrier layer of material such as polymer film, or more specifically a polyethylene terephthalate film, or any other suitable material. As should be apparent, the resultant laminate 22 includes retained interactive sections 52 arranged in series.

The barrier web 84 is drawn from a supply roll 86, such as in response to operation of one or more pairs of nip rollers 88, 90, so that the intermediate laminate 30 and barrier web 84 are nipped together between the downstream nip rollers 90. Prior to the nipping between the downstream nip rollers 90, one or more adhesive applicators 92 apply adhesive material to what will become an inner face of the intermediate laminate 30 and/or what will become the inner face of the cover web 84, so that the cover web will become broadly, securely adhered or bonded to the intermediate laminate to form the resultant laminate 22. Any suitable adhesive material may be supplied by the one or more adhesive applicators 92. The adhesive material supplied from the adhesive applicator(s) 92 is dried and/or cured so that the intermediate laminate 30 and barrier web 84 are bonded together. The resultant laminate 22 may be formed into a roll 94, and thereafter drawn from the roll and formed into constructs. The roll 94 may be characterized as being schematically illustrative of a conventional winding apparatus for forming the resultant laminate 22 into a roll. The forming of the resultant laminate 22 into constructs may be performed in any suitable manner. For example, the resultant laminate 22 may be formed into constructs such as, but not limited to, blanks, cartons, trays, bowls, press-formed constructs, or the like.

As mentioned above, the sacrificial laminate 76 may be wound into a roll 82, and that roll may be referred to as a sacrificial roll 82. As one example, the sacrificial roll 82 may be discarded. As a contrasting example and for the sake of efficiency, the sacrificial roll 82 may optionally be "reused" at least once, such as by moving it (or the sacrificial laminate 76 from it) upstream in the system 20, from the stripping station to the intermediate laminating station, so that the sacrificial roll 82 is used in place of/as the supply roll 64. Stated differently, the sacrificial laminate 76 (e.g., the sacrificial laminate 76 left over from a prior production run of the system 20) may be used as the sacrificial web 62 (e.g., in the present production run of the system), in which case the sacrificial web 62 may be referred to as a recycled sacrificial laminate. Typically, the recycled sacrificial laminate (e.g., the sacrificial laminate 76) will be supplied to the intermediate nip rollers 68 so that the preexisting scrap segments of the recycled sacrificial laminate (e.g., see the scrap segments 54 of the sacrificial laminate 76) will become exterior features of the resulting compound laminate (not shown in detail, but see the compound laminate 28 for example). Accordingly, when the recycled sacrificial laminate is used in a production run as discussed above, the adhesive material supplied by the adhesive applicator(s) 70 may be an adhesive material other than an adhesive material curable by ultraviolet light, since the exterior, preexisting scrap segments of the resulting compound laminate may interfere with transmission of ultraviolet light from the drying system 72 to the adhesive material positioned between the kisscut laminate 26 and the recycled sacrificial laminate of the resulting compound laminate.

Figure 9:
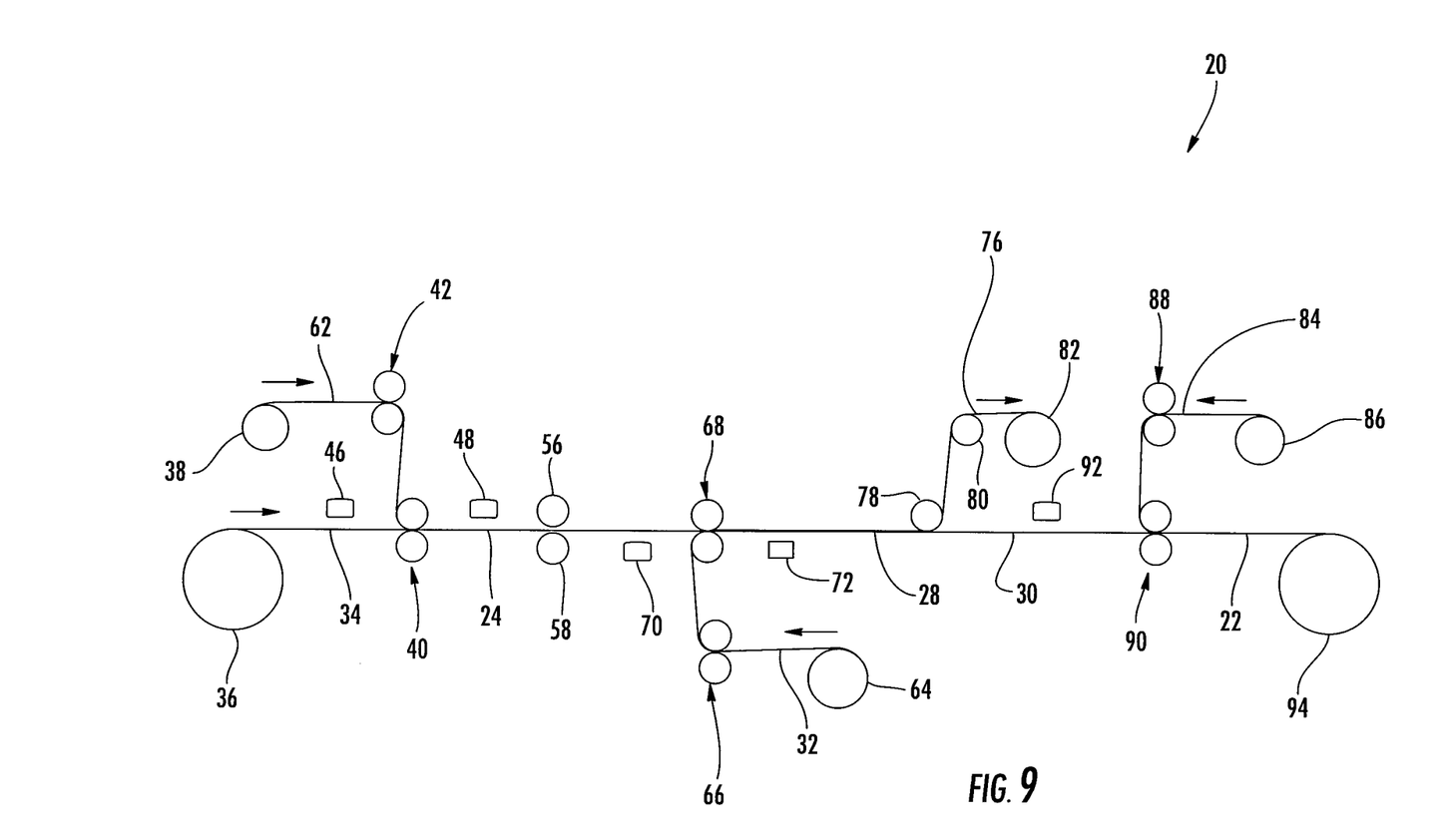
FIG. 9 is a side elevation view of a system for making a resultant laminate that includes patterned microwave energy interactive material, in accordance with a second embodiment of this disclosure.

A second embodiment of this disclosure is like the first embodiment of this disclosure, except for variations noted and variations that will be apparent to one of ordinary skill in the art. In this regard, FIG. 9 is a side elevation view in accordance with the second embodiment, and FIG. 9 is similar to FIG. 1, except that some of the features have been rearranged accordingly. Other arrangements are also within the scope of this disclosure.

Referring to FIG. 9, initial and kisscut laminates of the second embodiment comprise the interactive web 34, sacrificial web 62, and adhesive segments 74 (also see FIGS. 5 and 7, for example), wherein the initial laminate is formed at the upstream laminating station and the kisscut laminate is formed at the cutting station. Further referring to FIG. 9, the base web 32/adhesive segments 50 (also see FIGS. 5 and 7, for example) are laminated (at the intermediate laminating station) to the kisscut laminate of the second embodiment to form the compound laminate of the second embodiment. That is, the interactive web may be kiss cut/die cut after the interactive web is laminated to the sacrificial web 62 (e.g., as in the second embodiment), or the interactive web 34 may be kiss cut/die cut after the interactive web is laminated to the base web 32 (e.g., as in the first embodiment). The compound laminate of the second embodiment may be like (e.g., identical to or substantially identical to) the compound laminate 28 of the first embodiment shown in FIG. 4. Accordingly, the compound laminate 28 of the second embodiment is delaminated at the delaminating station into the intermediate and sacrificial laminates 30, 76 of the second embodiment, and thereafter the resultant laminate 22 of the second embodiment is formed at the downstream laminating station.

With regard to the variations of the first embodiment shown in FIGS. 5-8, the compound laminate of the second embodiment may be the same as the compound laminate 28 of the first embodiment, except that in some versions of the second embodiment the adhesive segments 74 and scrap interactive sections 54 may be slightly out of phase and/or the adhesive segments 74 may be slightly larger than the scrap interactive sections 54 (rather than the adhesive segments 50 and retained interactive sections 52 optionally being slightly out of phase and/or the adhesive segments 50 optionally being slightly larger than the retained interactive sections 52 as in the first embodiment). The adhesive segments 74 and scrap interactive sections 54 being slightly out of phase and/or the adhesive segments 74 being slightly larger than the scrap interactive sections 54 may provide advantages generally corresponding to those discussed above for the first embodiment.

When adhesive bonds are present between the base web 32 and the adjacent scrap interactive sections 54, the adhesive bonds between the base web 32 and the adjacent scrap interactive sections 54 are typically smaller than and/or weaker than the adhesive bonds between the sacrificial web 62 and the scrap interactive sections 54, so that the scrap interactive sections 54 are carried away by the sacrificial web 62 as it is stripped away at the stripping or delaminating station. For example, adhesive bonds between the base web 32 and the adjacent scrap interactive sections 54 may be provided in any suitable manner such as, but not limited to, by adhesive material arranged in a pattern of dots, as discussed above.

A third embodiment of this disclosure is like the first embodiment of this disclosure, except for variations noted and variations that will be apparent to one of ordinary skill in the art. The overall system of the third embodiment may be understood by referring to the system 20 of the first embodiment. As may be understood with reference to FIG. 1, in the third embodiment the positions of the base and barrier webs 32, 84 are interchanged as compared to the first embodiment. Accordingly, the barrier web 84 (rather than the base web 32) is supplied from the upstream supply roll 36, so that the covering and interactive webs 84, 34 are nipped together between the upstream nip rollers 40. Correspondingly, the base web 32 (rather than the barrier web 84) is supplied from the downstream supply roll 86, so that the base web 32 and the intermediate laminate 30 are nipped together between the downstream nip rollers 90 to form a resultant laminate. As a result of interchanging the base and barrier webs 32, 84 as discussed above, the resultant laminate of the third embodiment would be like the resultant laminate 22 of the first and second embodiments, except for being inverted. Notwithstanding the foregoing, this disclosure is not limited to the orientations and/or relative positions shown in the drawings and/or discussed above. As one example, the entire system 20 shown in FIG. 1 may be inverted. Likewise, other orientations, relative positions and/or the like are within the scope of this disclosure.

A fourth embodiment of this disclosure is like the first, second and third embodiments of this disclosure, except for variations noted and variations that will be apparent to one of ordinary skill in the art. Due to the similarity, components of the fourth embodiment that are identical, similar and/or function in at least some ways similarly to corresponding components of the first, second and third embodiments have reference numbers incremented by one hundred or two hundred.

Figure 10:
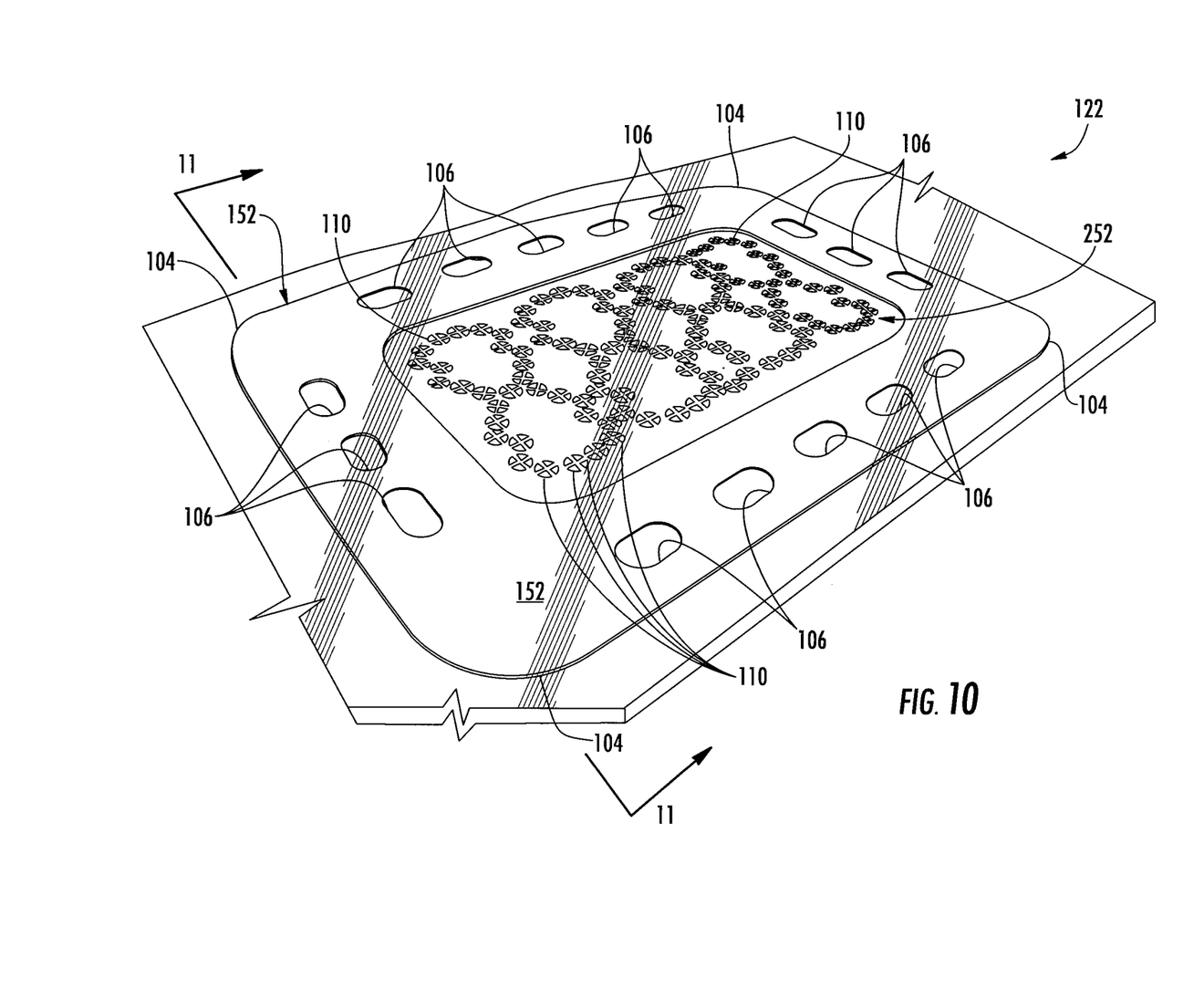
FIG. 10 illustrates a section of a resultant laminate that includes retained microwave energy interactive segments, in accordance with an embodiment of this disclosure.

Referring to FIG. 10, the retained interactive sections 152, 252, which are in the resultant laminate 122 of the fourth embodiment, define a series of microwave energy interactive assemblies that extends along the length of the resultant laminate, wherein each of the microwave energy interactive assemblies includes first and second retained interactive sections 152, 252. Only a single, representative microwave energy interactive web, assembly or apparatus is shown in FIG. 10. The interactive sections 152 and/or the interactive sections 252 may be omitted and/or configured differently than shown in FIG. 10.

As shown in FIG. 10, the first retained interactive section 152 is in the form of a metal foil band including somewhat rounded corners 104 and obround holes 106 in a spaced apart configuration. As used in this Detailed Description section of this disclosure for the fourth embodiment, the term "obround" refers to a shape substantially consisting of two semicircles connected by parallel lines tangent to their endpoints. The second retained interactive section 252 is the form of metal foil segments 110 arranged in clusters in a lattice-like configuration. Only a few of the foil segments 110 are identified by their reference numeral in FIG. 10. The first retained interactive section 152 is spaced from and forms a border around the second retained interactive section 252.

Figure 11:
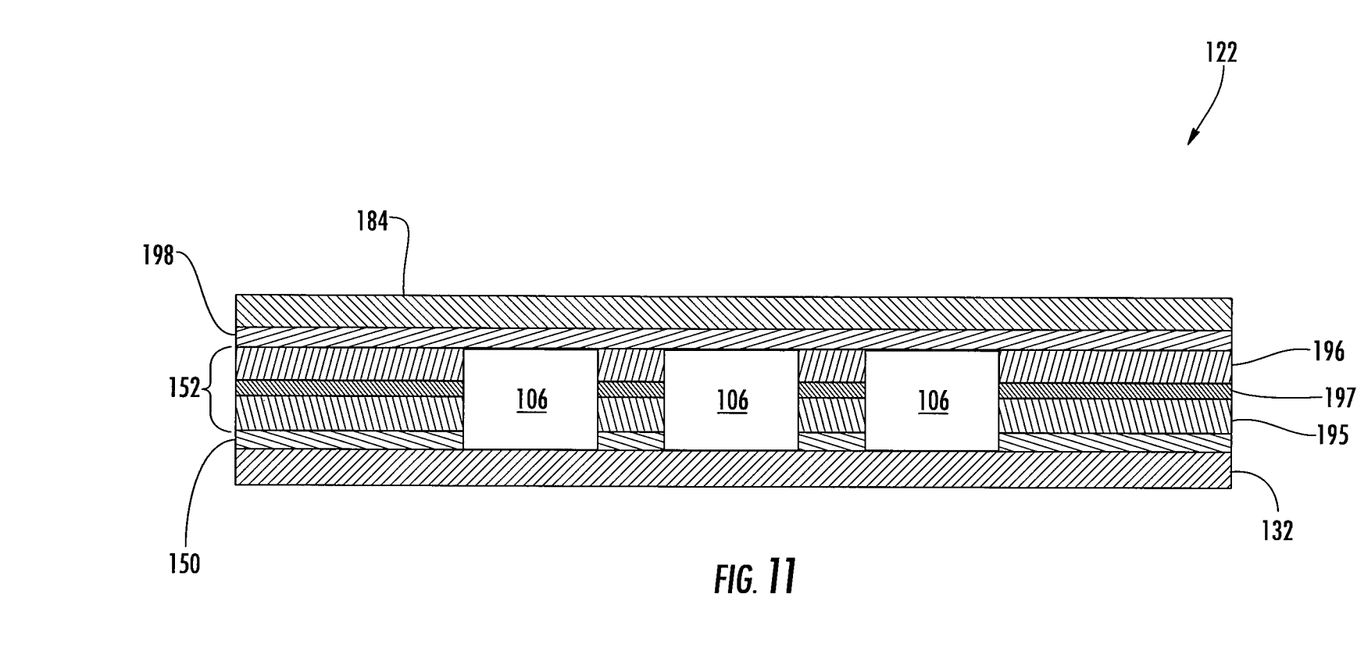
FIG. 11 is a cross-sectional view of a portion of the laminate of FIG. 10 taken along line 11-11 of FIG. 10, in accordance with an embodiment of this disclosure.

FIG. 11 is a schematic cross-sectional view of the resultant laminate 122 taken along line 11-11 in FIG. 10, wherein only the cross section is shown in FIG. 11. In the embodiment shown in FIGS. 10 and 11, and as best understood with reference to FIG. 11, the barrier web 184 spans continuously across the entire resultant laminate 122, so that the barrier web 184 obstructs each of the holes (e.g., the holes 106) in the retained interactive sections 152, 252, or more specifically the barrier web 184 spans across each of the holes in the retained interactive sections 152, 252, or even more specifically the barrier web 184 completely covers each of the holes in the retained interactive sections 152, 252. Similarly, the base web 132 completely covers each of the holes (e.g., the holes 106) in the retained interactive sections 152, 252, such that each of the holes may optionally or theoretically be in the form of a completely closed cavity.

Partially reiterating from above and mainly referring to FIG. 11, the interactive web 34 (see, e.g., FIG. 1) may optionally be a foil laminate comprising a layer or web of foil 195 joined to a web, layer or substrate 196 (e.g., paper or paperboard) by a layer of adhesive material 197, so that each of the retained interactive sections 152, 252 includes the foil 195, substrate 196 and adhesive material 197. As shown in FIG. 11, the resultant laminate 122 further includes the base web 132 that is connected to the foil 195 by the adhesive segments 150, and the barrier web 184 that is connected to the substrate 196 by a layer of adhesive material 198 supplied from the one or more adhesive applicators 92 (see, e.g., FIG. 1). The barrier web 184 and the adhesive material 198 may be transparent (e.g., substantially transparent), and the substrate 196 may be opaque, so that the substrate 196 is operative for concealing, partially concealing or masking the typically silver color of the foil 195 and/or functioning in any other suitable manner, such as discussed above.

In the embodiment shown in FIGS. 10 and 11, the cutter 58 (e.g., see FIG. 1) and/or other features of the cutting system are configured so that lines of disruption or die cuts 60 (FIGS. 3-5) are formed and defined in each of the foil 195 (FIG. 11), substrate 196 (FIG. 11) and adhesive material 197 (FIG. 11); the lines of disruption or die cuts 60 define pattern(s) in the foil 195, the lines of disruption or die cuts 60 define pattern(s) in the substrate 196, and the lines of disruption or die cuts 60 define a pattern(s) in the adhesive material 197; the pattern(s) in the foil 195, the pattern(s) in the substrate 196, and the pattern(s) in the adhesive material 197 are superposed with respect to one another; each of the holes 106 includes a hole in the foil 195, a hole in the substrate 196, and a hole in the adhesive material 197; and for each of the holes 106, the hole in the foil 195, hole in the substrate 196, and hole in the adhesive material 197 are superposed with respect to one another.

FIG. 11 may be schematic because, for example, the thickness of the retained interactive section 152 may be exaggerated and, in contrast to what is shown in FIG. 11 and with reference to the orientation shown in FIG. 11, the adhesive material 198 may extend into the holes (e.g., the holes 106) in the retained interactive sections 152, 252 and be directly bonded to the portions of the base web 132 that partially define the holes. Therefore, the barrier web 184 may extend into the holes (e.g., the holes 106) in the retained interactive sections 152, 252, and the barrier web 184 may be bonded (by way of the adhesive material 198) to the portions of the base web 132 that partially define the holes.

Alternatively, the interactive web 34/retained interactive sections 152, 252 may be inverted relative to the other layers of the resultant laminate 122, the substrate 196 and adhesive material 197 may be omitted, other layers or webs may be omitted, and/or other layers or webs may be included in the resultant laminates. The above-disclosed patterns (e.g., of the retained interactive sections 52, 152, 252) are provided as examples only, and other patterns are within the scope of this disclosure. For example, one or more of the above-discussed patterns (e.g., of the retained interactive sections 52, 152, 252) may be tailored to the desired end uses of the resultant laminates 22, 122.

The above-described exemplary embodiments are in no way intended to limit the scope of the present invention. It will be understood by those skilled in the art that while the present disclosure has been discussed above with reference to exemplary embodiments, various additions, modifications and changes can be made thereto without departing from the spirit and scope of the invention as set forth in the claims.

What is claimed is:

1. A method of forming a laminate comprising a pattern of microwave interactive material, the method comprising:
   forming a compound laminate comprising first, second and third webs, wherein
      the third web is positioned between the first and second webs,
      the third web comprises microwave interactive material and a plurality of lines of disruption at least partially defining first and second pluralities of sections of the third web,
      the forming of the compound laminate comprises bonding both of the first and second pluralities of sections of the third web to the second web with adhesive material, and
      the bonding of both of the first and second pluralities of sections of the third web to the second web is comprised of the second plurality of sections of the third web being adhesively bonded to the second web more securely than the first plurality of sections of the third web are adhesively bonded to the second web, wherein:
         the bonding of both of the first and second pluralities of sections of the third web to the second web with adhesive material is comprised of the adhesive material between the second and third webs being arranged in a pattern of adhesive segments so that there are unbonded areas between the second and third webs, and
         the unbonded areas are configured so that the second plurality of sections of the third web are adhesively bonded to the second web more securely than the first plurality of sections of the third web are adhesively bonded to the second web; and
   then separating the compound laminate into parts comprising a first laminate and a second laminate, wherein
      the first laminate comprises the first web and the first plurality of sections of the third web,
      the second laminate comprises the second web and the second plurality of sections of the third web, and
      the separating comprises
         adhesive bond failure between the second web and the first plurality of sections of the third web,
         relative movement between the first and second webs, and
         the adhesive bond failure being responsive to the relative movement between the first and second webs.

2. The method according to claim 1, wherein the separating comprises delaminating the first and second laminates from one another.

3. The method according to claim 1, wherein the first web comprises paper.

4. The method according to claim 1, wherein the second web comprises paper.

5. The method according to claim 1, further comprising laminating a fourth web to the second laminate, so that the second plurality of sections of the third web are positioned between the second and fourth webs.

6. The method according to claim 5, wherein:
   the second web comprises paper, and
   the fourth web comprises a polymer film.

7. The method according to claim 1, wherein:
   an initial laminate comprises the first and third webs;
   the forming of the compound laminate comprises laminating the initial laminate and the second web to one another; and
   the method further comprises forming the lines of disruption in the third web prior to the laminating of the initial laminate and the second web to one another.

8. The method according to claim 7, wherein:
   the third web is a foil laminate comprising foil and a substrate; and
   the forming of the lines of disruption comprises forming the lines of disruption in both the foil and the substrate, so that the lines of disruption define a pattern in the foil, the lines of disruption define a pattern in the substrate, and the pattern in the foil and the pattern in the substrate are superposed with respect to one another.

9. The method according to claim 7, wherein:
   the third web is a foil laminate comprising foil and a substrate; and
   the laminating is carried out so that the foil is positioned between the substrate and the second web.

10. The method according to claim 1, wherein the unbonded areas are respectively adjacent the first plurality of sections of the third web for at least partially causing the first plurality of sections of the third web to be adhesively bonded to the second web less securely than the second plurality of sections of the third web are adhesively bonded to the second web.

11. The method according to claim 1, wherein the adhesive segments are adjacent the second plurality of sections of the third web and larger than the second plurality of sections of the third web for at least partially causing the bonding of the first plurality of sections of the third web to the second web.

12. The method according to claim 1, wherein the adhesive segments are adjacent the second plurality of sections of the third web and partially out of phase with the second plurality of sections of the third web for at least partially causing the bonding of the first plurality of sections of the third web to the second web.

13. A method of forming a laminate comprising a pattern of microwave interactive material, the method comprising:
   forming a compound laminate comprising first, second and third webs, wherein
      the third web is positioned between the first and second webs,
      the third web comprises microwave interactive material and a plurality of lines of disruption at least partially defining first and second pluralities of sections of the third web,
      the forming of the compound laminate comprises bonding both of the first and second pluralities of sections of the third web to the first web with adhesive material, and
      the bonding of both of the first and second pluralities of sections of the third web to the first web is comprised of the first plurality of sections of the third web being adhesively bonded to the first web more securely than the second plurality of sections of the third web are adhesively bonded to the first web, wherein:

the bonding of both of the first and second pluralities of sections of the third web to the first web with adhesive material is comprised of the adhesive material between the first and third webs being arranged in a pattern of adhesive segments so that there are unbonded areas between the first and third webs, and the unbonded areas are configured so that the first plurality of sections of the third web are adhesively bonded to the first web more securely than the second plurality of sections of the third web are adhesively bonded to the first web; and then separating the compound laminate into parts comprising a first laminate and a second laminate, wherein the first laminate comprises the first web and the first plurality of sections of the third web, the second laminate comprises the second web and the second plurality of sections of the third web, and the separating comprises adhesive bond failure between the first web and the second plurality of sections of the third web, relative movement between the first and second webs, and the adhesive bond failure being responsive to the relative movement between the first and second webs.

14. The method according to claim 13, further comprising laminating a fourth web to the first laminate, so that the first plurality of sections of the third web are positioned between the first and fourth webs.

15. The method according to claim 14, wherein:

the first web comprises paper, and the fourth web comprises a polymer film.

16. The method according to claim 13, wherein:

an initial laminate comprises the second and third webs;

the forming of the compound laminate comprises laminating the initial laminate and the first web to one another; and the method further comprises forming the lines of disruption in the third web prior to the laminating of the initial laminate and the first web to one another.

17. The method according to claim 16, wherein:

the third web is a foil laminate comprising foil and a substrate; and the forming of the lines of disruption comprises forming the lines of disruption in both the foil and the substrate, so that the lines of disruption define a pattern in the foil, the lines of disruption define a pattern in the substrate, and the pattern in the foil and the pattern in the substrate are superposed with respect to one another.

18. The method according to claim 16, wherein:

the third web is a foil laminate comprising foil and a substrate; and the laminating is carried out so that the foil is positioned between the substrate and the second web.

19. The method according to claim 13, wherein the unbonded areas are respectively adjacent the second plurality of sections of the third web for at least partially causing the second plurality of sections of the third web to be adhesively bonded to the first web less securely than the first plurality of sections of the third web are adhesively bonded to the first web.

20. The method according to claim 13, wherein the adhesive segments are adjacent the first plurality of sections of the third web and larger than the first plurality of sections of the third web for at least partially causing the bonding of the second plurality of sections of the third web to the first web.

21. The method according to claim 13, wherein the adhesive segments are adjacent the first plurality of sections of the third web and partially out of phase with the first plurality of sections of the third web for at least partially causing the bonding of the second plurality of sections of the third web to the first web.

* * * * *